(12) United States Patent
Vadon et al.

(10) Patent No.: US 7,412,442 B1
(45) Date of Patent: Aug. 12, 2008

(54) AUGMENTING SEARCH QUERY RESULTS WITH BEHAVIORALLY RELATED ITEMS

(75) Inventors: Eric R. Vadon, Seattle, WA (US); Jeffrey D. Few, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 334 days.

(21) Appl. No.: 10/966,343

(22) Filed: Oct. 15, 2004

(51) Int. Cl.
*G06F 17/30* (2006.01)
(52) U.S. Cl. .............................................. 707/5; 707/7
(58) Field of Classification Search .................. 707/3, 707/5, 7, 101, 104.1
See application file for complete search history.

(56) References Cited

U.S. PATENT DOCUMENTS

| | | | | |
|---|---|---|---|---|
| 5,278,980 A | * | 1/1994 | Pedersen et al. ................ | 707/4 |
| 5,694,592 A | | 12/1997 | Driscoll | |
| 6,006,225 A | | 12/1999 | Bowman et al. | |
| 6,098,065 A | * | 8/2000 | Skillen et al. ................... | 707/3 |
| 6,185,558 B1 | | 2/2001 | Bowman et al. | |
| 6,195,654 B1 | | 2/2001 | Wachtel | |
| 6,363,378 B1 | * | 3/2002 | Conklin et al. ................. | 707/5 |
| 6,366,910 B1 | | 4/2002 | Rajaraman et al. | |
| 6,421,675 B1 | | 7/2002 | Ryan et al. | |
| 6,430,558 B1 | | 8/2002 | Delano | |
| 6,502,091 B1 | | 12/2002 | Chundi et al. | |
| 6,584,462 B2 | | 6/2003 | Neal et al. | |
| 6,606,102 B1 | | 8/2003 | Odom | |
| 6,665,655 B1 | * | 12/2003 | Warner et al. ................... | 707/2 |
| 6,671,681 B1 | | 12/2003 | Emens et al. | |
| 6,732,088 B1 | * | 5/2004 | Glance ........................... | 707/3 |
| 6,732,090 B2 | * | 5/2004 | Shanahan et al. .............. | 707/3 |
| 6,778,979 B2 | * | 8/2004 | Grefenstette et al. ........... | 707/3 |
| 6,785,671 B1 | | 8/2004 | Bailey et al. | |
| 7,089,237 B2 | * | 8/2006 | Turnbull et al. ................ | 707/5 |
| 7,152,061 B2 | | 12/2006 | Curtis et al. | |

(Continued)

FOREIGN PATENT DOCUMENTS

WO    WO 01/16806 A1    3/2001

(Continued)

OTHER PUBLICATIONS

Liu, F., Yu, C., and Meng, W., "*Personalized Web Search by Mapping User Queries to Categories*," Proceedings of the 11th International Conference on Information and Knowledge Management, CIKM 2002, McLean, VA, Nov. 4-9, 2002, International Conference on Information Knowledge Management, New York, NY: ACM, dated Nov. 4, 2002, pp. 558-565, XP-002325895.

(Continued)

*Primary Examiner*—Leslie Wong
(74) *Attorney, Agent, or Firm*—Knobbe, Martens, Olson & Bear LLP

(57) ABSTRACT

The results of search queries are augmented with behaviorally related items. Items that are behaviorally related to a particular search query may be identified by analyzing the item selection actions of users who submit the particular search query. For example, if a relatively large number of users who submit a particular search query eventually select a particular item (e.g., during subsequent searching or browsing), that item may subsequently be included in the search results for the search query, even though the item may not match the search query.

12 Claims, 9 Drawing Sheets item selection event table ⟋304

| time | user id | item id | selection action type | preceding query terms | |
|---|---|---|---|---|---|
| 7/3/2004 10:10:11 | C | 28834902 | purchase | Samsung mobile | ⟋801 |
| 7/3/2004 10:10:44 | A | 87142539 | add to cart | mystery | ⟋802 |
| 7/3/2004 10:15:09 | B | 45645646 | display detail | geometry, Morrissy | ⟋803 |
| 7/3/2004 10:16:25 | C | 12234556 | add to registry | Samsung mobile | ⟋804 |

U.S. PATENT DOCUMENTS

| | | | |
|---|---|---|---|
| 7,162,454 B1 * | 1/2007 | Donner et al. | 705/64 |
| 2002/0002502 A1 * | 1/2002 | Maes et al. | 705/26 |
| 2002/0072974 A1 * | 6/2002 | Pugliese et al. | 705/14 |
| 2002/0078045 A1 * | 6/2002 | Dutta | 707/7 |
| 2002/0103789 A1 * | 8/2002 | Turnball et al. | 707/3 |
| 2002/0188694 A1 | 12/2002 | Yu | |
| 2002/0194081 A1 * | 12/2002 | Perkowski | 705/26 |
| 2002/0198882 A1 | 12/2002 | Linden et al. | |
| 2003/0078928 A1 | 4/2003 | Dorosario et al. | |
| 2003/0220909 A1 | 11/2003 | Farrett | |
| 2004/0260677 A1 | 12/2004 | Malpani et al. | |

FOREIGN PATENT DOCUMENTS

WO      WO 01/46870 A1      6/2001

OTHER PUBLICATIONS

Peter G. Anick, "Adapting a Full-text Information Retrieval System to the Computer Troubleshooting Domain," Proceedings of the 17th annual international ACM SIGIR conference on research and development in information retrieval, pp. 349-358, 1994.

Joachims, Thorsten, "Optimizing Search Engines using Clickthrough Data," Proceedings of the 8th ACM SIGKDD international conference on knowledge discovery and data mining, ACM Press, pp. 133-142, Jul. 2002.

Wen, Ji-Rong, et al., "Query Clustering Using Content Words and User Feedback," Proceedings of the 24th annual international ACM SIGIR conference on research and development in information retrieval, ACM Press, pp. 442-443, Sep. 2001.

Radlinski, Filip, et al., "Query Chains: Learning to Rank from Implicit Feedback," Proceedings of the 11th ACM SIGKDD international conference on knowledge discovery in data mining (KDD '05), ACM Press, pp. 239-248, Aug. 2005.

* cited by examiner

FIG. 6 item selection event table — 304

| time | user id | item id | selection action type | preceding query terms |
|---|---|---|---|---|
| 7/3/2004 10:10:11 | C | 28834902 | purchase | |
| 7/3/2004 10:10:44 | A | 87142539 | add to cart | |
| 7/3/2004 10:15:09 | B | 45645646 | display detail | |
| 7/3/2004 10:16:25 | C | 12234556 | add to registry | |

601, 602, 603, 604, 611, 612, 613, 614, 615

FIG. 7 search query event table — 700

| time | user id | query term(s) |
|---|---|---|
| 7/1/2004 10:08:34 | A | detective |
| 7/3/2004 10:10:07 | C | Samsung mobile |
| 7/3/2004 10:10:09 | B | geometry |
| 7/3/2004 10:10:09 | A | mystery |
| 7/3/2004 10:13:11 | B | Morrissy |
| 7/3/2004 10:15:30 | B | Grinch |

701, 702, 703, 704, 705, 706, 711, 712, 713

FIG. 8 item selection event table — 304

| time | user id | item id | selection action type | preceding query terms |
|---|---|---|---|---|
| 7/3/2004 10:10:11 | C | 28834902 | purchase | Samsung mobile |
| 7/3/2004 10:10:44 | A | 87142539 | add to cart | mystery |
| 7/3/2004 10:15:09 | B | 45645646 | display detail | geometry, Morrissy |
| 7/3/2004 10:16:25 | C | 12234556 | add to registry | Samsung mobile |

801, 802, 803, 804

| term \ item id | 45645646 | 45645647 |
|---|---|---|
| Morrissey | .4126 | .0012 |
| Morrissey | .7548 | 0 | term/item scoring table — 900

FIG. 9

AUGMENTING SEARCH QUERY RESULTS WITH BEHAVIORALLY RELATED ITEMS

TECHNICAL FIELD

The present invention is directed to the field of query processing.

BACKGROUND

Many World Wide Web sites permit users to perform searches to identify a small number of interesting items among a much larger domain of items. As an example, several web index sites permit users to search for particular web sites among most of the known web sites. Similarly, many online merchants, such as booksellers, permit users to search for particular products among all of the products that can be purchased from a merchant. In many cases, users perform searches in order to ultimately find a single item within an entire domain of items.

In order to perform a search, a user submits a query containing one or more query terms. The query also explicitly or implicitly identifies a domain of items to search. For example, a user may submit a query to an online bookseller containing terms that the user believes are words in the title of a book. A query server program processes the query to identify within the domain items matching the terms of the query. The items identified by the query server program are collectively known as a query result. In the example, the query result is a list of books whose titles contain some or all of the query terms. The query result is typically displayed to the user as a list of items. This list may be ordered in various ways. For example, the list may be ordered alphabetically or numerically based on a property of each item, such as the title, author, or release date of each book. As another example, the list may be ordered based on the extent to which each identified item matches the terms of the query.

It is fairly common for a user to specify a query containing a term that doesn't match any items. This may happen, for example, where a user mistypes the non-matching term, or when the user types a term that, though it does not match any items, is a synonym of a word that matches one or more items. In such cases, conventional techniques, which present only items that satisfy the query, present no items to the user. When no items are presented to a user in response to issuing a query, the user can become frustrated with the search engine, and may even discontinue its use.

Accordingly, an approach to processing search queries that does not rely on the terms of the query matching text associated with items would have significant utility.

BRIEF DESCRIPTION OF THE DRAWINGS

FIG. 6 is a table diagram showing sample contents of an item selection event table typically used by the facility.

FIG. 7 is a table diagram showing sample contents of a search query event table typically used by the facility.

FIG. 8 is a table diagram showing sample contents of the item selection event table following population of the preceding query terms column.

FIG. 9 is a table diagram showing sample contents of a term/item scoring table typically generated by the facility.

DETAILED DESCRIPTION

Figure 1:
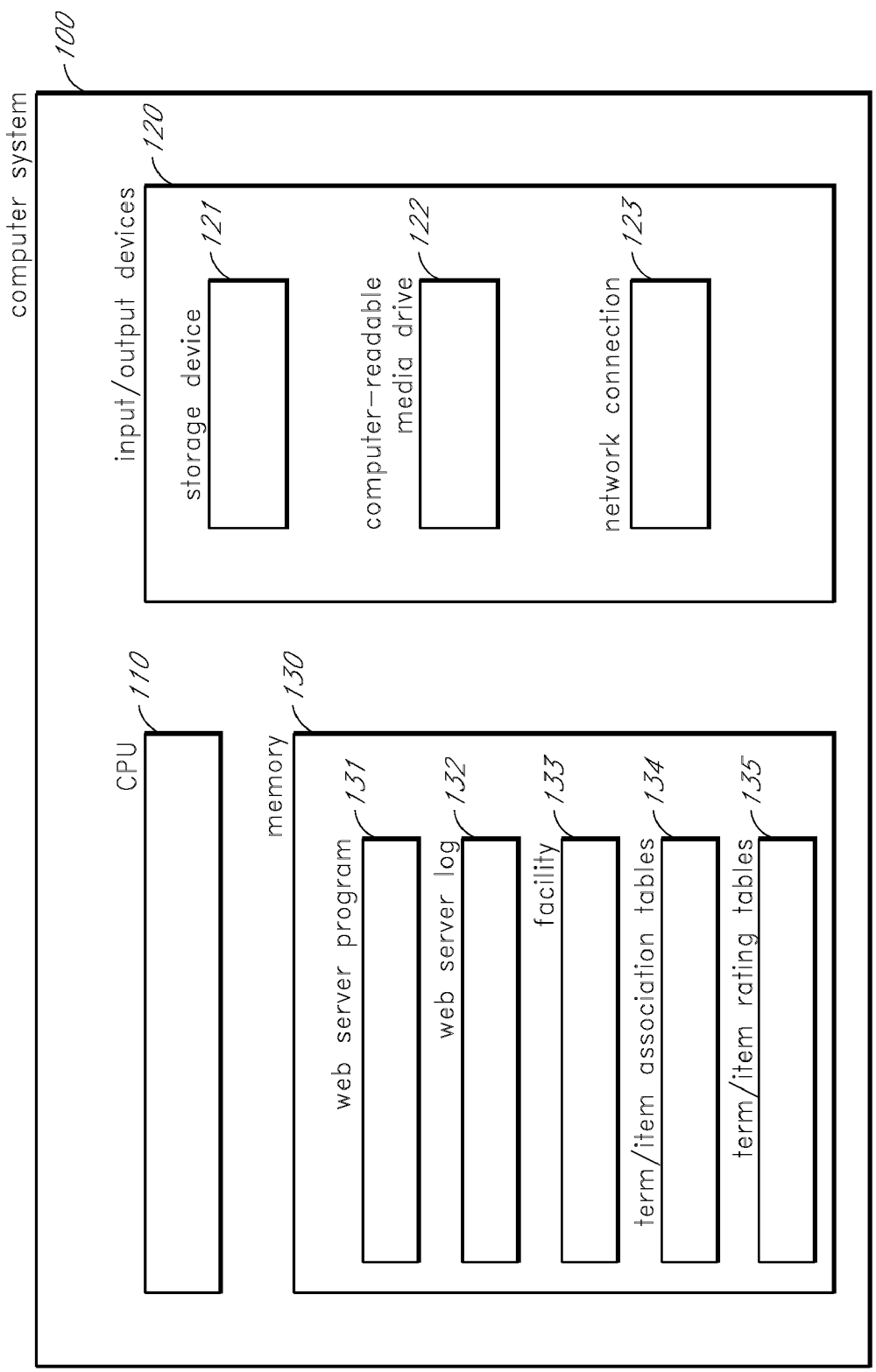
FIG. 1 is a high-level block diagram showing typical components of a computer system or other device upon which the facility executes.

A software facility (the "facility") is described that (1) discerns from user behavior associations between query terms and items relevant to such query terms, and (2) exploits such associations, such as (a) to add to a query result items not included in the query result produced for the query by a search engine but nonetheless likely to be relevant to the query, or (b) to generate a set of item recommendations for a user based upon the contents of the queries recently submitted by the user.

For a group of users, the facility monitors queries submitted and item selection actions taken, such as viewing an item's item detail page (e.g., as in an online catalog), adding an item to a shopping cart, adding an item to a gift registry, ordering an item, sampling an item, or rating or reviewing an item. For each item selection action by a user, the facility (1) identifies queries submitted by that same user in a short period of time before the selection action, and (2) correlates the item that is the subject of the selection action with the query terms in the identified queries. The facility uses the formed correlations to generate, for each of a number of combinations of a query term and an item, a score reflecting the tendency of users submitting queries containing the query term to go on to select the item. The facility can use a variety of approaches described below to perform the monitoring and determine the scores.

In order to exploit these term/item scores to add to a query result items not included by the search engine in the query result produced for the query but nonetheless likely to be relevant to the query, when a new query is received, in addition to being provided to the search index to generate a search result listing items that satisfy the query, it is provided to the facility to identify items that, when paired with the query term(s) in the query, have the highest scores. The facility provides the identified items for inclusion in or display with the query result generated by the search engine.

In this way, the facility makes query results potentially more valuable in a variety of different situations. Where a user has submitted a query containing a misspelled query term that, if properly spelled, would match a particular item, and the misspelling is somewhat common among users tracked by the facility, the facility can cause the item to be included in the augmented search result. For example, where a user submits the query "Morrissy" in an attempt to locate an album by the musician Morrissey, the facility may add one or more Morrissey albums to the produced query result where other users have previously submitted a query containing "Morrissy," and gone on to do any of the following: discovered their spelling error, resubmitted the search with the correct spelling, and selected the album; or used a way other than search to locate and select the album, such as using a browse tree, best seller list, recommendation, wish list, reference to an external source such as an online or paper music magazine, etc. Similarly, when a user has submitted a query containing a synonym for a search term that would match an item that is commonly used by other users to search for the item, the facility can cause the item to be included in the augmented search result. For example, where a user submits the query "Samsung mobile" in an attempt to find wireless telephones manufactured by Samsung, none of which has the word "mobile" associated with them, the facility can cause one or more Samsung cellular wireless telephone items to be added to the query result.

Where a user has submitted a query containing a query for a first item that is commonly purchased—or otherwise selected—together with a second, "complement" item, the facility can add the complement item to the search result produced for the query. For example, where a user submits a query that identifies a particular printer item that is often purchased together with a particular printer cable item, the facility can add the printer cable item to the produced search result. Additionally, where a number of users use the same query terms to search for a first item, then follow a "related items" link on the first item's item detail page to a second item, the facility can add the second item to the search result. For example, where users commonly (1) submit the query "Grinch" to locate the DVD *Dr. Seuss—How the Grinch Stole Christmas*, then (2) follow a "related items" link on that item's item detail page to the item detail page for the DVD *Frosty the Snowman*, the facility can add the *Frosty the Snowman* DVD item to the search results generated for subsequent "Grinch" queries.

The facility can also exploit the term/item scores to generate a set of item recommendations for a user based upon the contents of the queries recently submitted by the user. When an opportunity arises to present item recommendations to a user—such as when the user displays a special recommendations page, or when the user displays a page of another type that has space reserved for user recommendations—the facility retrieves a history of the user's recent queries, and for each item, combines scores for combinations of that item with each query term appearing in the user's query history. The facility then selects a set of items to recommend that have the highest combined score. For example, where an opportunity arises to provide recommendation to a user who has recently submitted the queries "detective" and "mystery," and where users that submit queries containing either of these query terms frequently buy or otherwise select the book *The Adventures of Sherlock Holmes*, the facility can provide recommendations to the user that include this book item. Recommendations generated in this way are often "fresher" than conventional recommendations based upon the user's purchases, which are sometimes criticized as stagnant. In some embodiments, recommendations generated for a user based upon the contents of the queries recently submitted by the user are combined with conventional recommendations for presentation to the user.

By compiling and/or exploiting the term/item scores in some or all of the ways described above, the facility can assist users by leveraging the earlier experiences and actions of all other users. In particular, where other users have had to expend a larger amount of effort to select an item not initially included with the query result that they received, a user that receives an augmented search result or recommendation produced by the facility that contains the item can select the item directly from the augmented search result or recommendation and avoid any additional effort.

FIG. 1 is a high-level block diagram showing typical components of a computer system or other device upon which the facility executes. As shown in FIG. 1, the computer system 100 comprises a central processing unit (CPU) 110, input/output devices 120, and a computer memory (memory) 130. Among the input/output devices is a storage device 121, such as a hard disk drive; a computer-readable media drive 122, which can be used to install software products, including the facility, which are provided on a computer-readable medium, such as a CD-ROM; and a network connection 123 for connection the computer system 100 to other computer systems (not shown). The memory 130 contains a web server program 131 for receiving HTTP requests for a merchant or other publisher's website, including search query requests and selection action requests; a web server log 132 in which the web server logs as events the HTTP requests it receives; the facility 133; term/item association tables 134 generated by the facility from the web server log; and term/item rating tables 135 generated by the facility from the term/item association tables, and used by the facility to determine the extent of relatedness of a term to an item, and to support such functionality as augmenting search results and generating recommendations based upon term/item relatedness. While the facility may be implemented on a computer system or other device configured as described above, those skilled in the art will recognize that it may also be implemented on computer systems and devices having different configurations.

Figure 2:
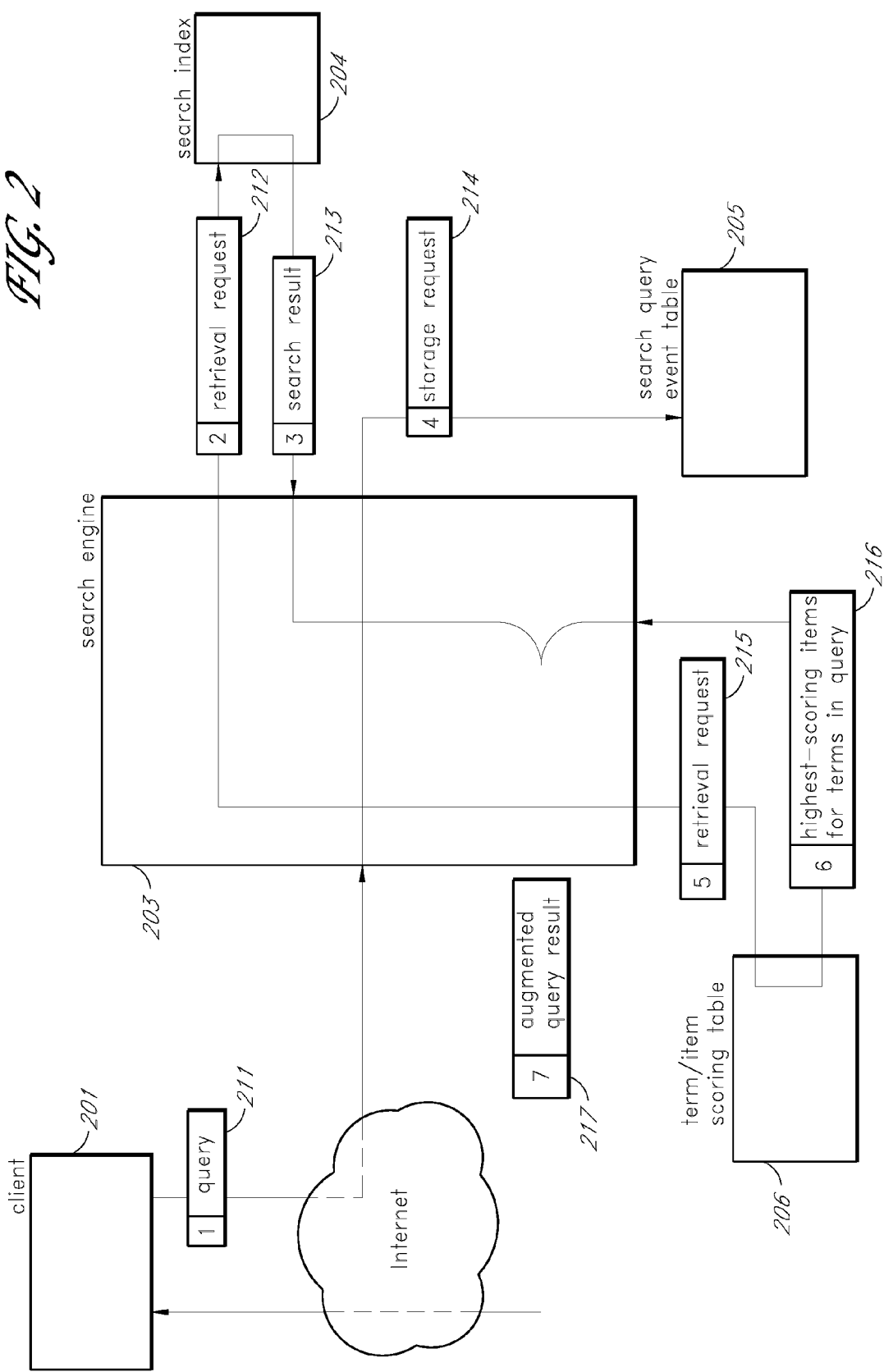
FIG. 2 is a data flow diagram showing data flow relating to a query submitted by a client.
Figure 3:
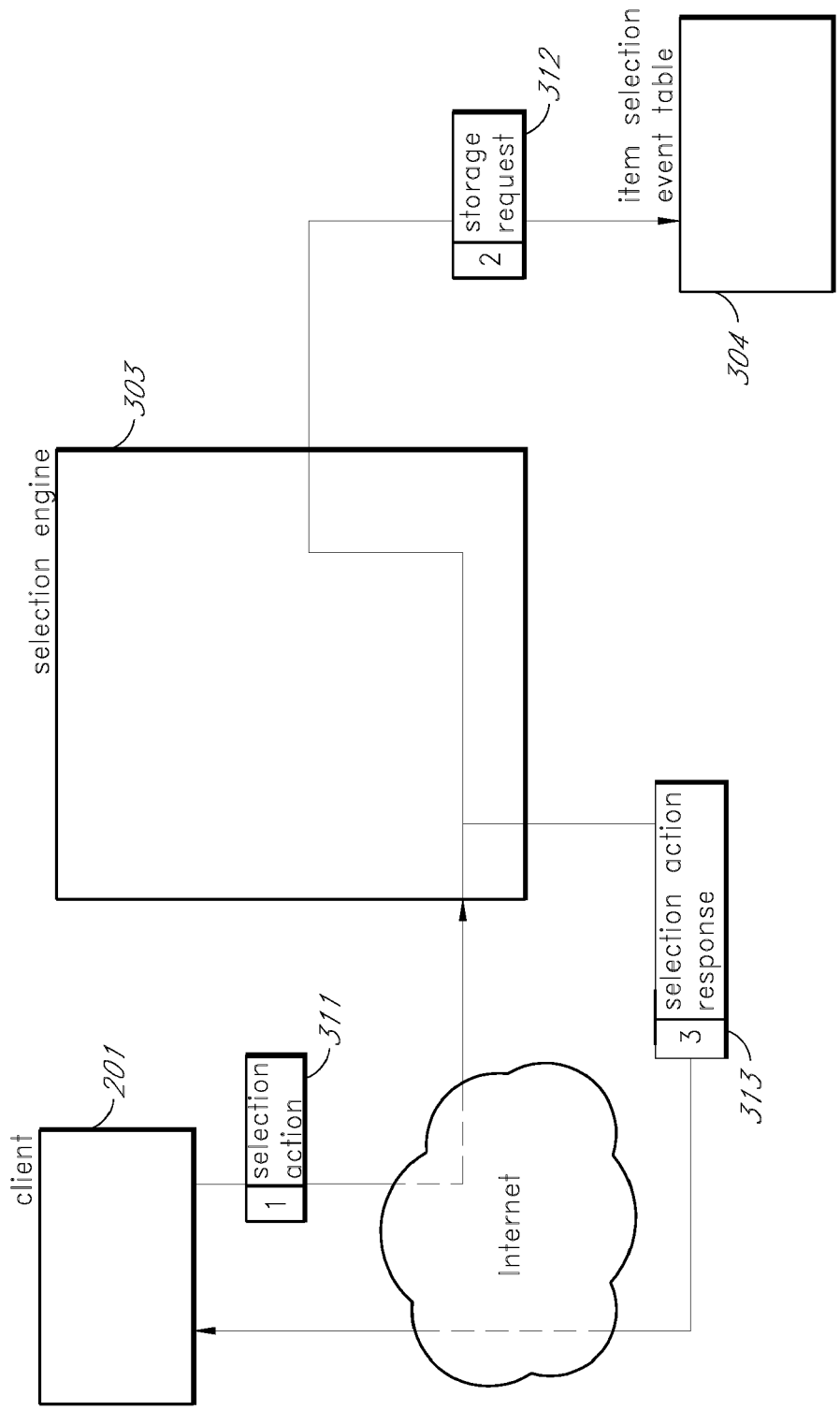
FIG. 3 is a data flow diagram showing data flow relating to the performance of a selection action by a client.
Figure 4:
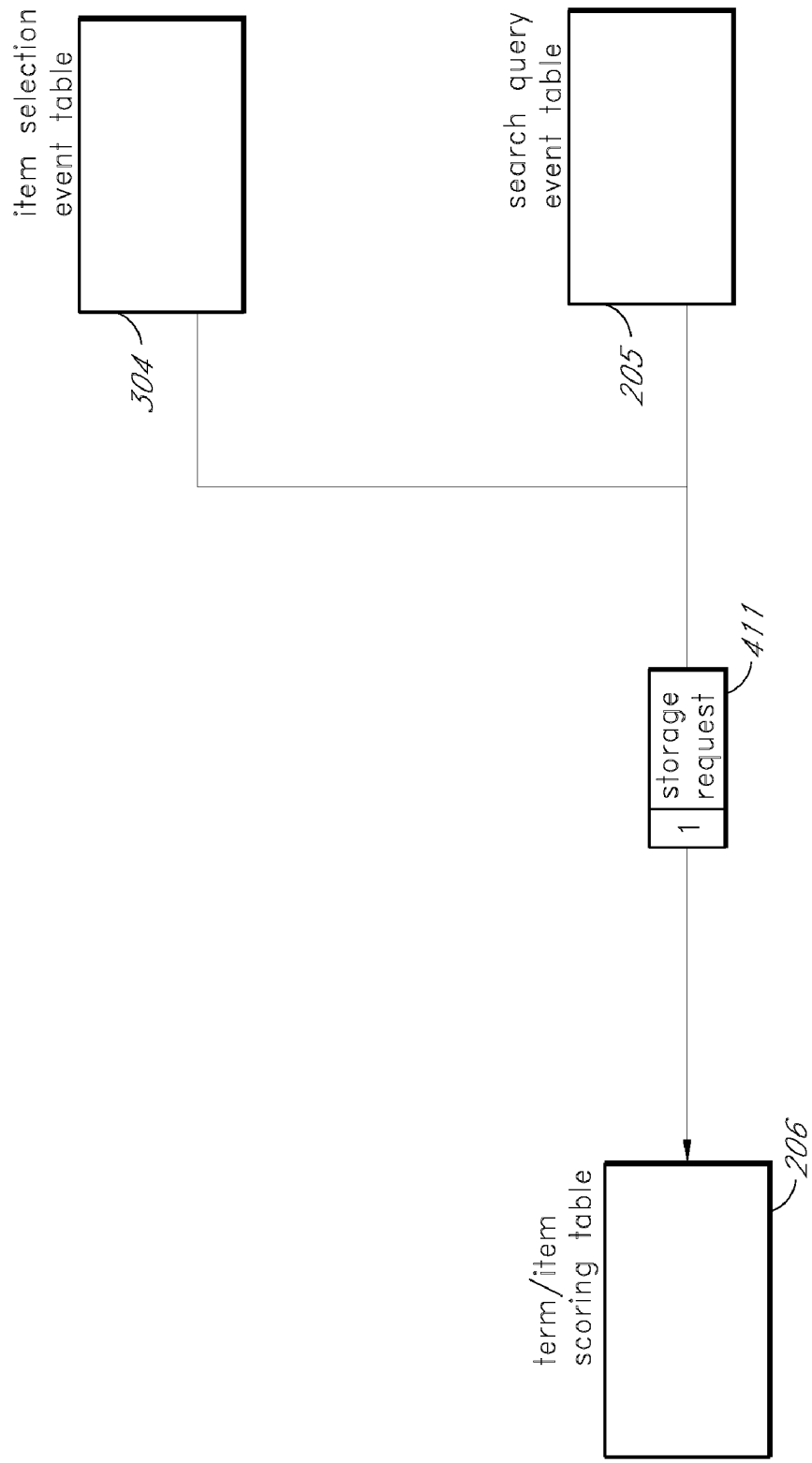
FIG. 4 is a data flow diagram showing data flow relating to the population of the term/item scoring table.

FIGS. 2-4 are data flow diagram showing typical data flows producing using the facility. FIG. 2 is a data flow diagram showing data flow relating to a query submitted by a client. FIG. 2 shows that a client 201 submits a query 211 to a search engine 203. In response to receiving the query, the search engine sends items 212, 214, and 216, as described below. The search engine sends a retrieval request 212 to a search index 204, which returns a search result 213 based upon the contents of the search index. The search engine sends a storage request 214 to a search query event table 205 to store information about the query event. The search engine sends a retrieval request 215 to the term/item scoring table 206, which returns highest-scoring items for the terms in the query 216. When the search engine receives items 213 and 216, it sends an augmented query result 217 via the Internet to the client.

FIG. 3 is a data flow diagram showing data flow relating to the performance of a selection action by a client. FIG. 3 shows a selection action 311 sent from a client 201 to a selection engine 303. In response to receiving the selection action, the selection engine (a) sends a storage request 312 to the item selection event table 304 to store information about the selection action, and (b) sends a selection action response 313 via the Internet to the client.

Those skilled in the art will appreciate that queries submitted as shown in FIG. 2 and selection actions submitted as shown in FIG. 3 may be submitted by various programs executing on the client in various ways. For example, either or both may be submitted by a web browser program at the direct instigation of a human user and received by a web server on behalf of the search engine and/or the selection engine. Where queries and/or selection actions are submitted in this way, an IP address of the client or the value of a cookie stored on the client may be used as the user ID used to correlate search query events and item selection events to generate term/item scores. Alternatively, various other kinds of programs executing on the client may submit queries and/or selection actions, which may be received by various kinds of programs on behalf of the search engine and/or selection engine. For example, the query and/or selection action may be submitted and received as web services requests. Where this is true, the facility may use the client's IP address or a requester ID submitted in the web services request to correlate queries with selection actions.

FIG. 4 is a data flow diagram showing data flow relating to the population of the term/item scoring table. Based upon information in both the item selection event table 304 and the search query event table 205, the storage request 411 is sent to the term/item scoring table in order to populate the term/item scoring table with term/item scores that are based upon the contents of the item selection event table and the search query event table.

Figure 5:
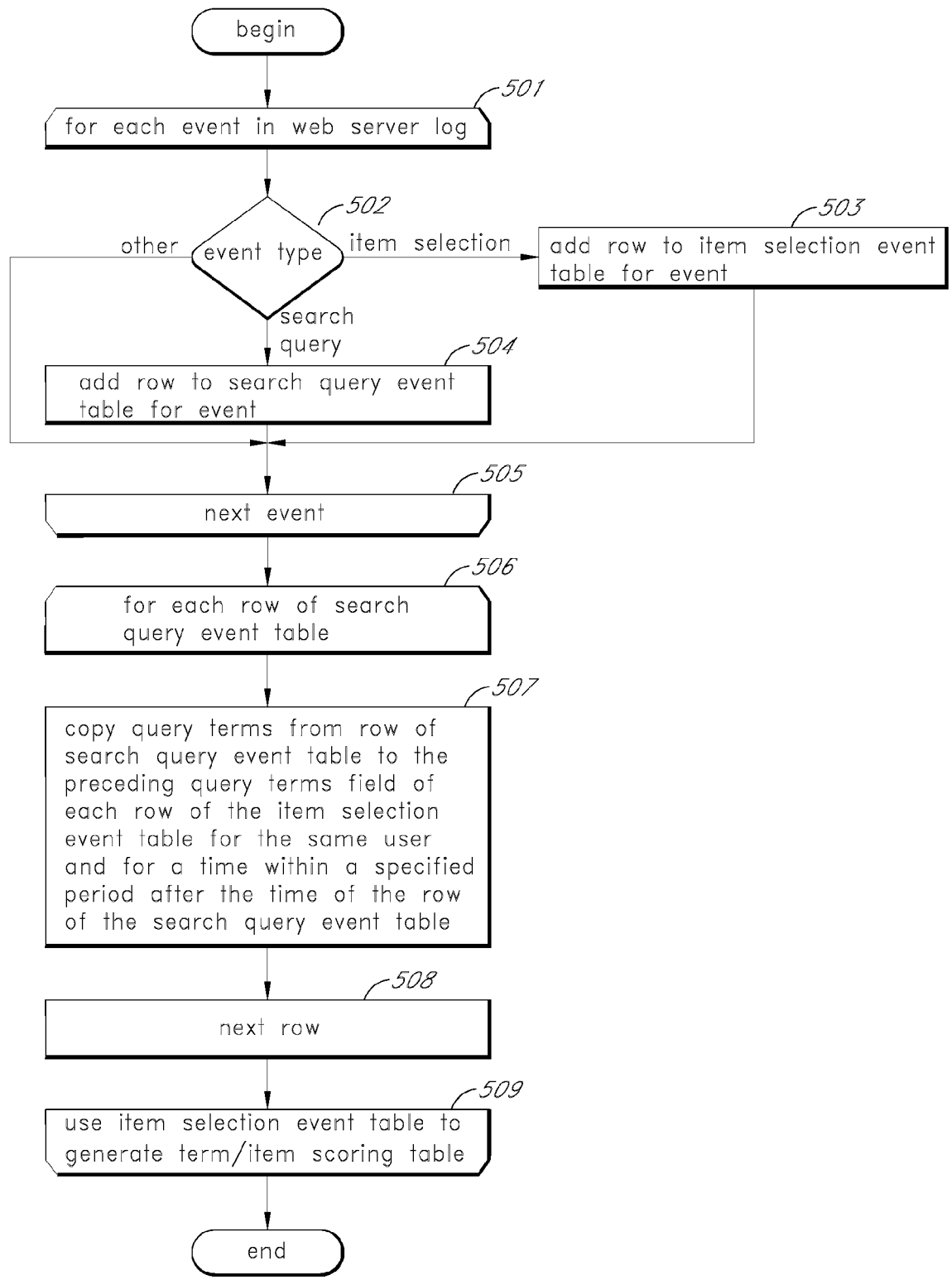
FIG. 5 is a flow diagram showing steps typically performed by the facility to generate term/item relatedness scores.

FIG. 5 is a flow diagram showing steps typically performed by the facility to generate term/item relatedness scores. The facility typically performs these steps periodically as HTTP requests are received by the web server and logged as events in the web server log.

In steps 501-505, the facility loops through events in the web server log that have not yet been processed. In step 502, the facility branches on the event type of the event: if the event is an item selection event, then the facility continues in step 503; if the event is a search query event, then the facility continues in step 504; if the event is an event of another type, then the facility continues in step 505. In step 503, the facility adds a row for the event to an item selection event table.

FIG. 6 is a table diagram showing sample contents of an item selection event table typically used by the facility. The item selection event table 304 is made up of rows, such as rows 601-604. Those skilled in the art will appreciate that a typical item selection event table would contain a much larger number of rows than shown in FIG. 6, as would other tables shown in additional table diagrams discussed below. Each row in the item selection event table corresponds to a different item selection event encountered in the web log, and is divided into the following columns: a time column 611 containing the time at which the HTTP request corresponding to the event was received by the web server; a user ID column 612 containing an identifier for the user from whom the HTTP request was received; an item ID column 613 containing an item ID identifying the item that was the subject of the selection request; a selection action type column 614 containing an indication of the type of selection action performed; and a preceding query terms column 615, left empty in step 503 and described further below in conjunction with FIG. 8. For example, the contents of row 601 indicate that, at 10:10:11 a.m. on Jul. 3, 2004, an HTTP request was received from user C representing the purchase of an item having item ID 28834902. Those skilled in the art will recognize that the data shown in FIG. 6 and the data shown in the additional table diagrams discussed hereafter, or similar data, could be stored in a variety of different forms, including being stored in various types of memory devices, in various organizations, in one or more tables or other data structures, using various forms of indexing, compression, encryption, etc.

Returning to FIG. 5, after step 503, the facility continues in step 505. In step 504, the facility adds a row for the event to a search query event table maintained by the facility.

FIG. 7 is a table diagram showing sample contents of a search query event table typically used by the facility. The search query event table 700 is made up of rows, such as rows 701-706. Each row corresponds to a search query event encountered in the web server log, and is divided into the following columns: a time column 711 indicating the time at which the search query request was received; a user ID column 712 containing a user ID identifying the user from whom the search query request was received; and a query terms column 713 including one or more query terms specified in the search query request. For example, contents of row 701 indicate that, at 10:08:34 a.m. on Jul. 1, 2004, a search query request was received a user having user ID A containing the query term "detective." In some embodiments, the facility treats an entire query string as a term, while other embodiments of the facility treat each individual word of the query string as a term.

Returning to FIG. 5, after step 504, the facility continues in step 505. In step 505, if additional events remaining in the web server log to be processed, then the facility continues in step 501 to process the next event, else the facility continues in step 506.

In steps 506-508, the facility loops through each row of the search query event table. In step 507, the facility copies the query terms from the current row of the search query event table to the preceding query terms field of each row of the item selection event table that both (1) contains the same user ID, and (2) has a time that is within a specified period after the time of the row of the search query event table. The size of the specified period of time is configurable, and should be based on what is understood to be the typical amount of time after performing a search that a user may select an item that is related to the search. Typical periods of time may be ten minutes, one hour, five hours, one day, one week, etc. In step 508, if additional rows of the search query event table remain to be processed, then the facility continues at step 506 to process the next row, else the facility continues in step 509.

FIG. 8 is a table diagram showing sample contents of the item selection event table following population of the preceding query terms column. In populating the preceding query terms column, the facility has used the time period of one day to determine whether a query request is related to an item selection request. In row 801, it can be seen that "Samsung mobile" has been added to the preceding query terms field from row 702 of the search query event table, which is the only row of the search query event table containing user ID C, whose time is before the time of row 801 but not more than one day before that time. On the same basis, the same query terms are added to row 804. In row 802, it can be seen that the query term "mystery" has been added to the preceding query terms field, from row 704 of the search query event table, which has the same user ID, and a time before, but not more than one day before, the time of row 802. It can be seen that the query term "detective" in row 701 of the search query event table has not been added to the preceding query terms field of row 802 despite matching the user ID of row 802, because row 701 has a time that is more than one day before the time of row 802. In row 803, it can be seen that "geometry" has been added to the preceding query terms field from row 703 of the search query event table whose user ID matches and whose time was before but not more than one day before the time of row 803. "Morrissy" has also been added to the preceding query terms column of row 803 from row 705 of the search query event table. "Grinch" from row 706 has not been added to the preceding query terms field of row 803 despite matching the user ID of row 803, as its time is after the time of row 803.

Returning to FIG. 5, in step 509, the facility uses the item selection event table to generate a term/item scoring table containing relatedness scores for combinations of terms and items. After step 509, these steps conclude.

FIG. 9 is a table diagram showing sample contents of a term/item scoring table typically generated by the facility. The term/item scoring table 900 can be an extremely large table, having large number of both rows and columns, only a very small subset of which is shown in table 900. In some embodiments, the facility uses a variety of large and/or sparse matrix storage and access techniques to represent the table contents. The table is comprised of rows, such as rows 901 and 902, each representing a different query term. For example, row 901 represents the query term "Morrissey." The rows of the table are intersected by columns, such as columns 911 and 912, each representing a different item. For example, column 911 represents an item having item ID 45645646. Each intersection of a row with a column contains a term/item relatedness score for the term represented by the row and the item represented by the column. For example, the score 4126 occurring at the intersection of row 901 in column 911 is the relatedness score for the combination of the term "Morrissey" and the item having item ID 45645646. Based upon the scores shown, it can be seen that the term "Morrissy" is significantly more related to item 45645646 than is the term "Morrissey." On the other hand, the term "Morrissey" is slightly more related to item 45645647 than is the term "Morrissy."

Embodiments of the facility generate term/item scores in a variety of ways. Most of the approaches to scoring used by the facility involve, at a minimum, counting the number of users that both (1) submitted a query for the query term, and (2) within the prescribed amount of time, performed a selection action with respect to the item. In one approach to scoring, the facility may simply sum the number of users that both submitted a query for the term and selected the item. In some embodiments, the facility weights differently the types of selection actions. For example, the facility may weight a purchase selection action more heavily than a display item detail selection action. Also, the facility may weight more heavily selection actions that require a greater level of effort to perform, as is discussed in greater detail in U.S. patent application Ser. No. 09/847,954, entitled "Identifying the Items Most Relevant to a Current Query Based on Items Selection in Connection with Similar Queries," filed on May 2, 2001 (now U.S. Pat. No. 7,124,129, issued on Oct. 17, 2006), which is hereby incorporated by reference in its entirety.

Additional approaches used by embodiments of the facility include:

$$\text{score}_1(\text{term, item}) = C/SQRT(A \cdot B) \quad (1)$$

where:
A=number of users that submitted a query for the term,
B=number of users that selected the item, and
C=number of users that both submitted string and selected the item.

$$\text{score}_2(\text{term, item}) = (A/B)/(C/D) \quad (2)$$

where:
A=number of users that both submitted string and selected the item,
B=number of users that submitted string,
C=number of users that did not submit a query for the term and selected the item, and
D=number of users that did not submit a query for the term, $$\text{score}_3(\text{term, item}) = (A/C)/(E/F) \quad (3)$$

where:
A=number of users that both submitted string and selected the item,
C=number of users that did not submit a query for the term and selected the item,
E=number of users that submitted a query for the term but did not access the category, and
F=number of users that did not submit a query for the term and did not access the category.

$$\text{score}_4(\text{term, item}) = (C/B - (\text{alpha})^* A/D) \quad (4)$$

where:
A=number of users that selected the item,
B=number of users that submitted a query for the term,
C=number of users that both submitted a query for the term and selected the item, and
D=total number of users who have selected any item and have submitted any search.

The above mentioned scores can be combined in a variety of ways to produce a weighted average of multiple scores. For example:

$$\text{score}_5(\text{term, item}) = \Sigma W_i \text{score}_i(\text{term, item}) \quad (5)$$

where W is a weighting function for each correlation score, $\text{score}_i$ is the correlation score itself, and $\Sigma W_i = 1$. For example, the faculty could combine approaches (2) and (4) above as follows:

$$CS = w^*(\text{score}_2) = (1-w)^*(\text{score}_4) \quad (6)$$

where w is a weighting factor such as 0.20.

In some embodiments, the facility uses a sliding window approach to incorporate the most recent information derived from weblogs in the relatedness scores determined by the facility. Suitable approaches of this type are described in the aforementioned U.S. patent application Ser. No. 09/847,954 (now U.S. Pat. No. 7,124,129), and in U.S. patent application Ser. No. 10/817,554, entitled "Automated Detection of Associations Between Search Criteria and Item Categories Based on Collective Analysis of User Activity Data," filed on Apr. 2, 2004 (published on Oct. 6, 2005 as 2005/0222987 A1), which is hereby incorporated by reference in its entirety. In some embodiments, the facility uses an approach of maintaining separate sets of relatedness scores for different user populations of various types. A suitable approach of this type is described in the aforementioned U.S. patent application Ser. No. 09/847,954.

Figure 10:
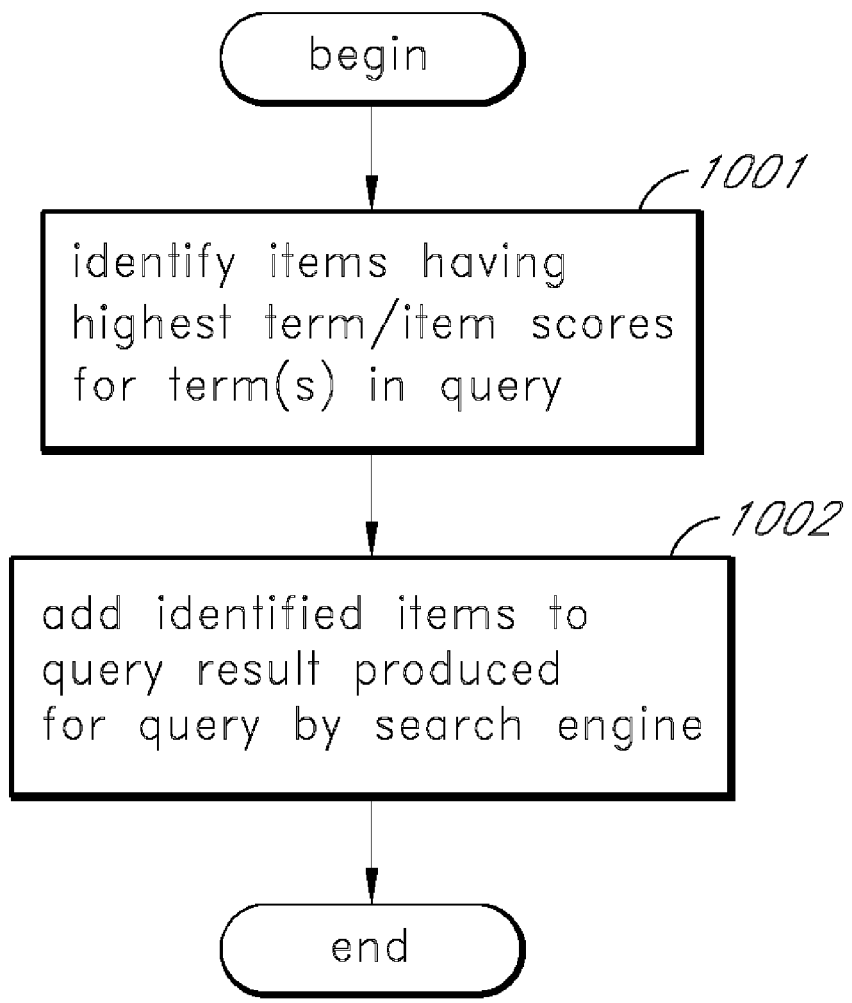
FIG. 10 is a flow diagram showing steps typically performed by the facility in order to augment a query result produced by a search engine for a particular query string.
Figure 11:
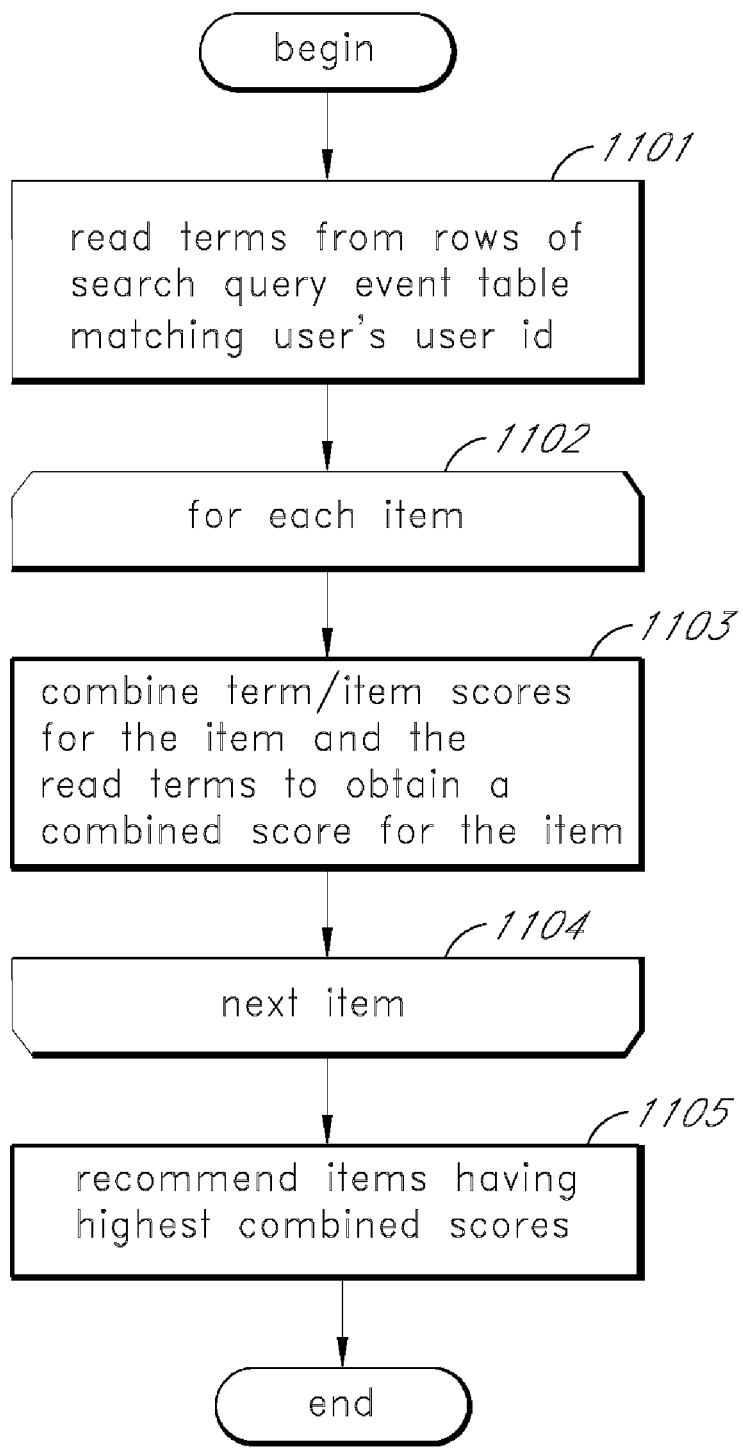
FIG. 11 is a flow diagram showing steps typically performed by the facility in order to generate a set of item recommendations for a particular user.

FIGS. 10 and 11 are flow diagrams showing how the facility can exploit term/item relatedness scores. FIG. 10 is a flow diagram showing steps typically performed by the facility in order to augment a query result produced by a search engine for a particular query string. In step 1001, the facility identifies items having the highest term/item scores for the term or terms in a query. In some embodiments, the facility treats an entire query string as a term, while other embodiments of the facility treat each individual word of the query string as a term. In step 1002, the facility adds the items identified in step 1001 to the query result produced for the query by the search engine. In step 1002, the facility can either combine the items identified in step 1001 seamlessly into the list of items already in the query result, or may insert a distinct list of the identified items that is visually separated from the list of items produced by the search engine. For some queries, the search engine may produce empty query results, in which case the augmented query result produced in step 1002 contains only items identified based on their term/item scores. In some embodiments, the facility includes certain related information with each item it adds to the query result, such as, for example, a link to the item detail page for the item; an image related to the item; catalog text associated with the item; the item's price; the item's level of availability; controls for purchasing the item, adding it to a wish list, or performing other selection actions; etc. After step 1002, the steps conclude.

FIG. 11 is a flow diagram showing steps typically performed by the facility in order to generate a set of item recommendations for a particular user. In step 1101, the facility reads query terms from the rows of the search query event table that match the user's user ID. In some embodiments, the facility processes the rows in step 1101 in later-to-earlier time order, and reads terms only from a limited number of rows, and/or only from rows having dates no more than a certain amount of time in the past.

In steps 1102-1104, the facility loops through each item. In step 1103, the facility combines the term/item scores for the combinations of the current item and each of the terms read in step 1101 to obtain a combined score for the item. In step 1104, if additional items remain to be processed, then the facility continues in step 1102 to process the next item, else the facility continues in step 1105. In some embodiments (not shown), the facility limits the number of items for which it performs the processing in step 1103, such as by performing the processing only for items that have at least one term/item score with one of the red terms that exceeds a score threshold.

In step 1105, the facility recommends one or more items having the highest combined scores. After step 1105, these steps conclude.

The facility may perform the steps of FIG. 11 either synchronously in response to an opportunity to present item recommendations to a particular user, or asynchronously, in a periodic batch for all users. The item recommendations generated by the facility may be presented to a user in various ways, such as by including the item recommendations in a dedicated item recommendations web page; including the item recommendations in a smaller area of a web page primarily devoted to another subject; e-mailing the item recommendations to the user; etc.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer-implemented method of improving search results based on actions of users, the method comprising:
    maintaining search event data and item selection event data in computer storage, the search event data descriptive of search queries submitted by users to a search engine to search for items, the item selection event data descriptive of item selections actions performed by users;
    calculating, and storing in computer memory, a score that represents a degree to which a particular search query is related to a particular item, said item being an item that is not included in a query result of said search query, said score being dependent upon the search event data and the item selection event data, and being reflective of a frequency with which users who submit the search query subsequently select the item; and
    based on said score, augmenting the query result of the search query with said item to cause the item to be presented to a user in search results for said search query.

2. The method of claim 1, wherein calculating the score comprises using a score generation method that produces a normalized score falling within a bounded range having an upper bound and a lower bound.

3. The method of claim 1, wherein calculating the score comprises augmenting the score in response to an event sequence in which a user: (1) submits the search query and is presented with search results that do not include the item, (2) subsequently, submits an alternative search query and is presented with search results that include the item, and (3) selects the item from said search results of the alternative search query.

4. The method of claim 1, wherein calculating the score comprises taking into consideration (a) a number of users who both submitted the search query and selected the item, and (b) a total number of users who submitted the search query.

5. The method of claim 1, wherein calculating the score comprises giving different amounts of weight to different types of item selection actions.

6. The method of claim 1, wherein the item is a product represented in an electronic catalog.

7. A system that provides improved search results to users, the system comprising:
    a computer data repository that stores search event data and item selection event data, the search event data descriptive of search queries submitted by users to a search engine to search for items, the item selection event data descriptive of item selection actions performed by users;
    a computer system programmed to use the search event data and the item selection event data to calculate a score that represents a degree to which a particular search query is related to a particular item, said item being an item that is not included in a query result of said search query, said score reflecting a tendency of users who submit the search query to subsequently select the item, said computer system comprising a memory; and
    a search engine system programmed to use the score to determine whether to augment the query result of the search query with said item.

8. The system of claim 7, wherein the computer system is programmed to calculate the score using a score generation method that produces a normalized score falling within a bounded range having an upper bound and a lower bound.

9. The system of claim 7, wherein the computer system is programmed to augment the score in response to an event sequence in which a user: (1) submits the search query and is presented with search results that do not include the item, (2) subsequently, submits an alternative search query and is presented with search results that include the item, and (3) selects the item from said search results of the alternative search query.

10. The system of claim 7, wherein the computer system is programmed to give different amounts of weight to different types of item selection actions.

11. The system of claim 7, wherein the computer system is programmed to generate the score using a method that takes into consideration (a) a number of users who both submitted the search query and selected the item, and (b) a total number of users who submitted the search query.

12. The system of claim 7, wherein the item is a catalog item represented on an item detail page of an electronic catalog, and the computer system is programmed to calculate the score using a method that gives greater weight to a purchase of the item than to a viewing event in which a user views said item detail page.

* * * * *